US012784966B2

(12) United States Patent
Hsieh et al.

(10) Patent No.: US 12,784,966 B2
(45) Date of Patent: Nov. 3, 2026

(54) SIMPLIFIED NETWORK TRANSFORMER

(71) Applicant: TAI-TECH ADVANCED ELECTRONICS CO., LTD., Taoyuan City (TW)

(72) Inventors: Ming-Yen Hsieh, Taoyuan City (TW); Pao-Lin Shen, Taoyuan City (TW); Hsiang-Chung Yang, Taoyuan City (TW); Wei-Hsuan Lo, Taoyuan City (TW)

(73) Assignee: TAI-TECH ADVANCED ELECTRONICS CO., LTD., Taoyuan City (TW)

( * ) Notice: Subject to any disclaimer, the term of this patent is extended or adjusted under 35 U.S.C. 154(b) by 643 days.

(21) Appl. No.: 18/466,840

(22) Filed: Sep. 14, 2023

(65) Prior Publication Data

US 2025/0095908 A1 Mar. 20, 2025

(51) Int. Cl.
*H01F 27/29* (2006.01)
*H01F 27/30* (2006.01)

(52) U.S. Cl.
CPC ........... *H01F 27/29* (2013.01); *H01F 27/306* (2013.01)

(58) Field of Classification Search
CPC ........ H01F 27/29; H01F 27/306; H01F 19/04; H01F 27/38; H01F 17/045; H01F 27/292
See application file for complete search history.

(56) References Cited

U.S. PATENT DOCUMENTS

| | | | | |
|---|---|---|---|---|
| 2014/0292464 | A1* | 10/2014 | Takagi | H01F 27/292 336/192 |
| 2017/0053726 | A1* | 2/2017 | Takagi | H01F 17/045 |
| 2017/0196093 | A1* | 7/2017 | Takagi | H01F 19/04 |
| 2017/0200548 | A1* | 7/2017 | Takagi | H01F 27/2828 |
| 2018/0374632 | A1* | 12/2018 | Kawahara | H01F 27/2823 |
| 2019/0156984 | A1* | 5/2019 | Hsieh | H01F 27/29 |
| 2020/0013541 | A1* | 1/2020 | Mikogami | H01F 27/006 |
| 2021/0233702 | A1* | 7/2021 | Otsuka | H01F 27/006 |

FOREIGN PATENT DOCUMENTS

| | | | | |
|---|---|---|---|---|
| CN | 109036799 | * | 12/2018 | |
| CN | 109036799 A | * | 12/2018 | H01F 27/24 |

* cited by examiner

*Primary Examiner* — Mang Tin Bik Lian

(57) ABSTRACT

The network transformer includes an iron core body, and first, second, and third winding assemblies. The iron core body has first and second winding sections. A first flange and a second flange are on both ends of the iron core body, and a third flange situated between the first and second flanges. The first winding section is positioned between the first and third flange s, while the second winding section is located between the second and third flanges. The first, second, and third flanges respectively have first, second, and third electrode sets. The two ends of the coils in the first winding assembly are electrically connected to the first electrode set. The second winding assembly has the two ends of the coils electrically connected to the third electrode set. The third winding assembly has the two ends of the coils electrically connected to the second and third electrode sets.

5 Claims, 6 Drawing Sheets

SIMPLIFIED NETWORK TRANSFORMER

BACKGROUND OF THE INVENTION

(a) Technical Field of the Invention

The present invention is generally related to transformers and more particularly to a network transformer of a simplified structure.

(b) Description of the Prior Art

FIGS. 1 and 2 show a conventional network transformer. The transformer 100 and common-mode filter 200 are two separate components. Not only does this arrangement consume more time during manufacturing processes (such as double the time for creating magnetic cores and winding), but the two-component setup also results in higher material costs. Additionally, the use of separate flanges increases complexity and occupies a larger space.

SUMMARY OF THE INVENTION

Therefore, a novel network transformer of a simplified structure is disclosed, which includes

- an iron core body including a first winding section, a second winding section, a first flange and a second flange on both ends of the iron core body, and a third flange situated between the first flange and the second flange, where the first winding section is positioned between the first flange and the third flange, while the second winding section is located between the second flange and the third flange; the first flange has a first electrode set comprising a first electrode, a second electrode, a third electrode, and a fourth electrode; the second flange has a second electrode set comprising a fifth electrode and a sixth electrode; the third flange has a third electrode set comprising a seventh electrode, an eighth electrode, a ninth electrode, and a tenth electrode;
- a first winding assembly including a first coil and a second coil, where both ends of the first coil and the second coil are electrically connected (soldered) to the first electrode set and are wound around the first winding section;
- a second winding assembly including a third coil and a fourth coil, where both ends of the third coil and the fourth coil are electrically connected (soldered) to the third electrode set and are wound around the first winding section; and
- a third winding assembly including a fifth coil and a sixth coil, where both ends of the fifth coil and the sixth coil are electrically connected (soldered) to the second electrode set and the third electrode set, and are wound around the second winding section.

Through the above design, the present invention integrates a transformer and a common-mode filter into a single unit, thereby reducing the need for flanges, effectively decreasing the product's size, and lowering the time and cost required for manufacturing and assembly. Additionally, this design achieves the same circuit effects as conventional network transformers.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
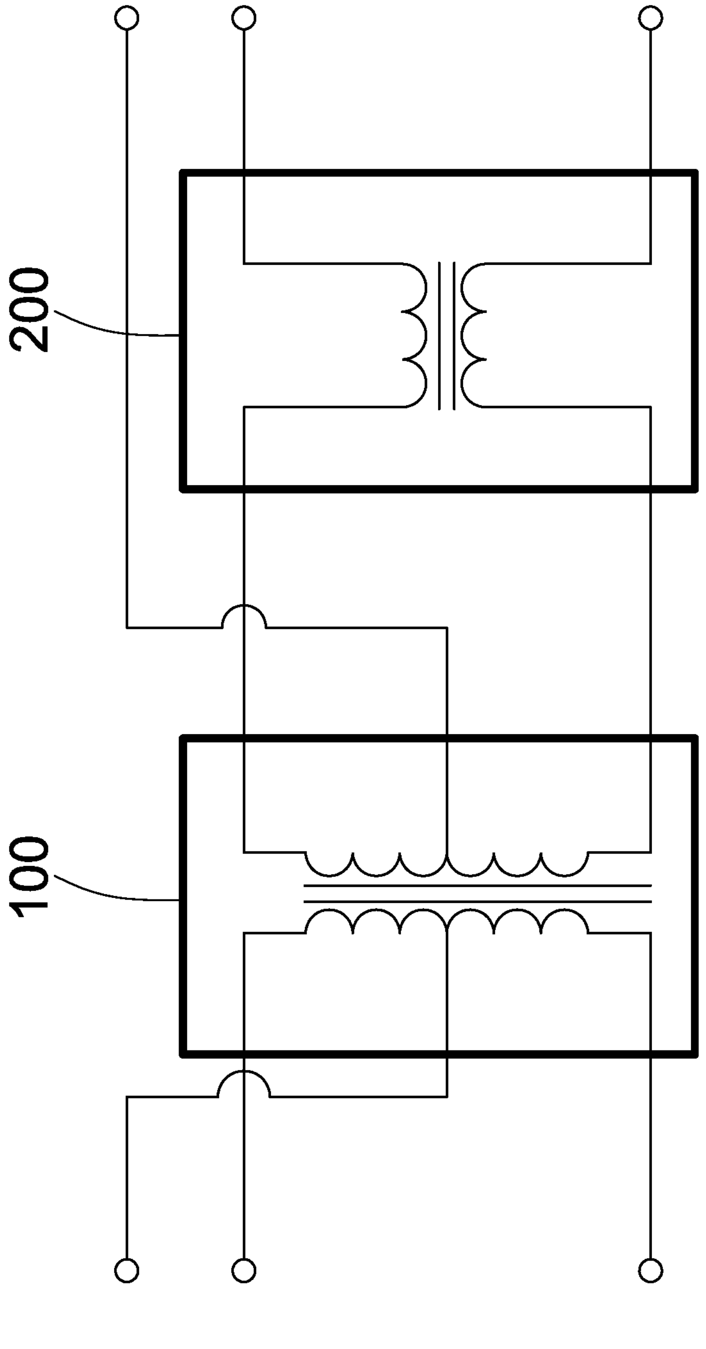
PRIOR ART FIG. 1
FIG. 1 is an equivalent circuit diagram of a conventional network transformer.
Figure 2:
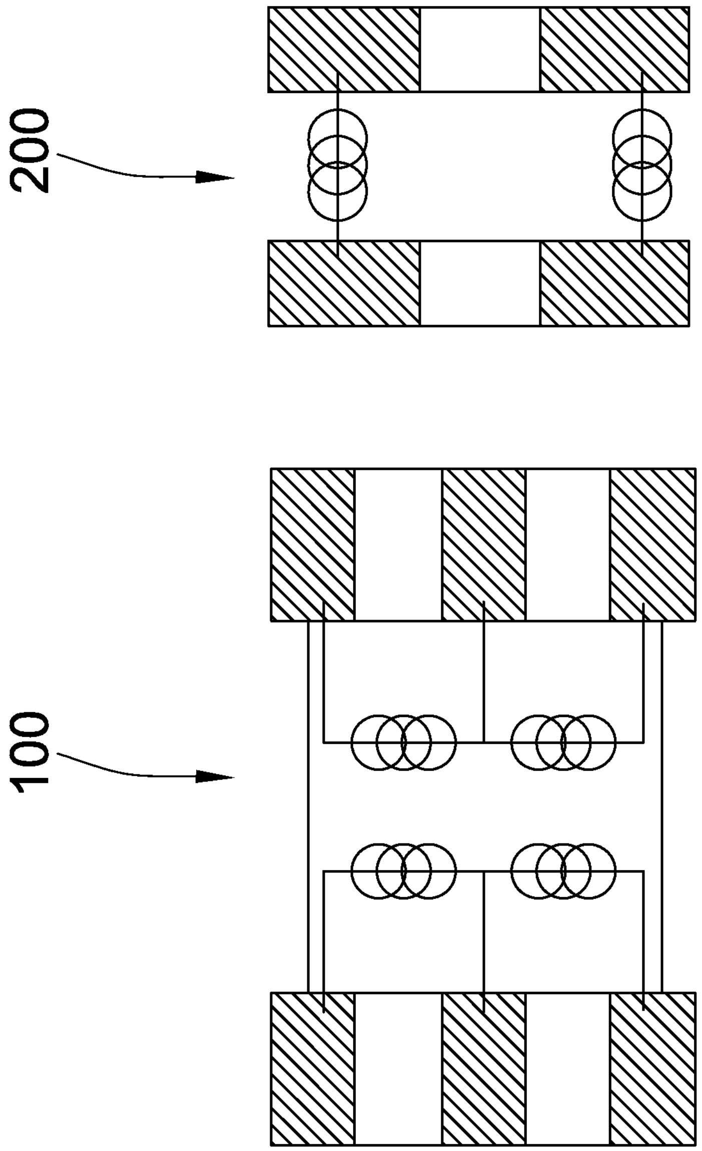
PRIOR ART FIG. 2
FIG. 2 is a schematic diagram showing the transformer and a common-mode filter of the conventional network transformer of FIG. 1.
Figure 3:
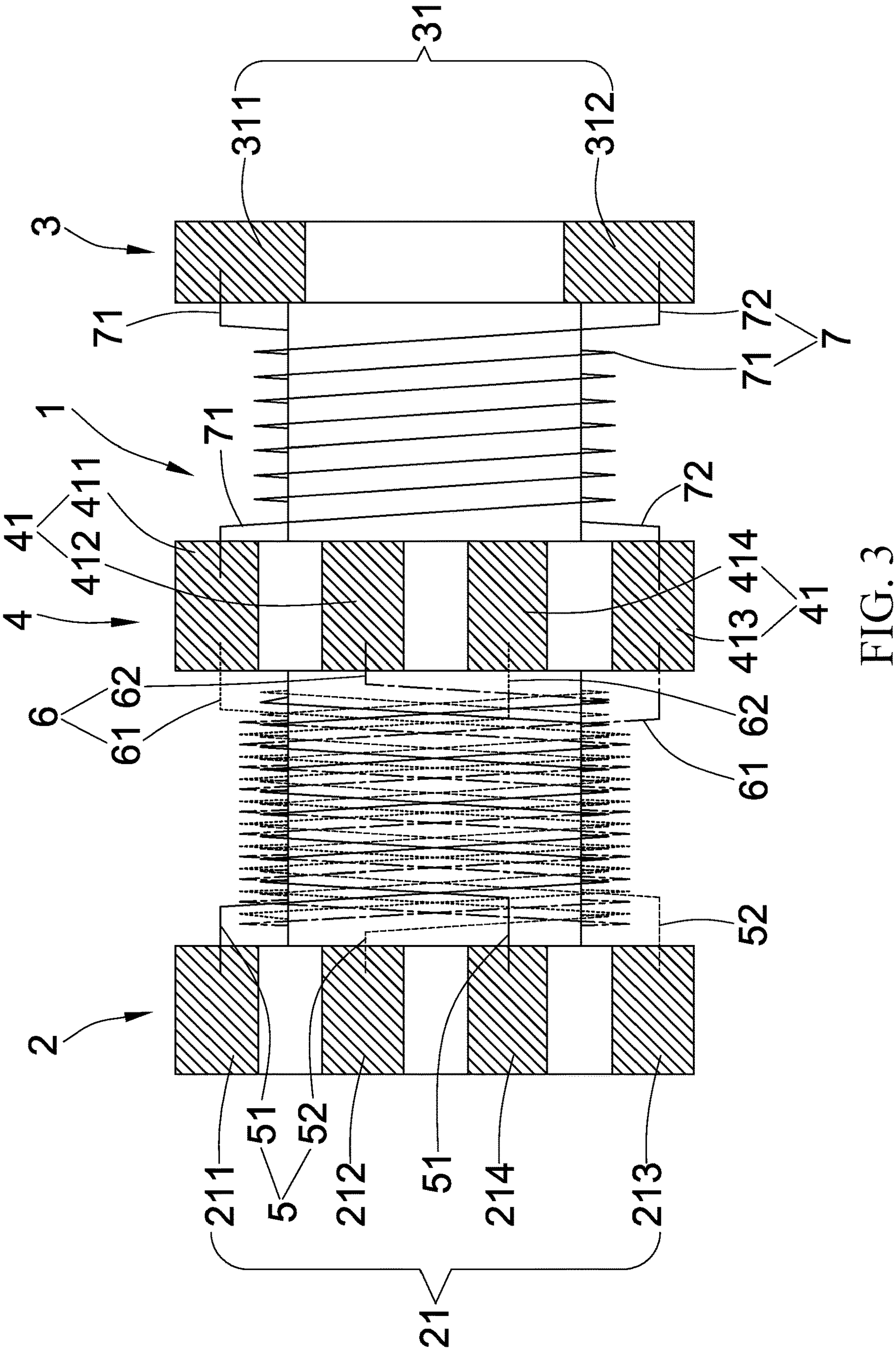
FIG. 3 is a schematic diagram showing a network transformer according to an embodiment of the present invention.
Figure 4:
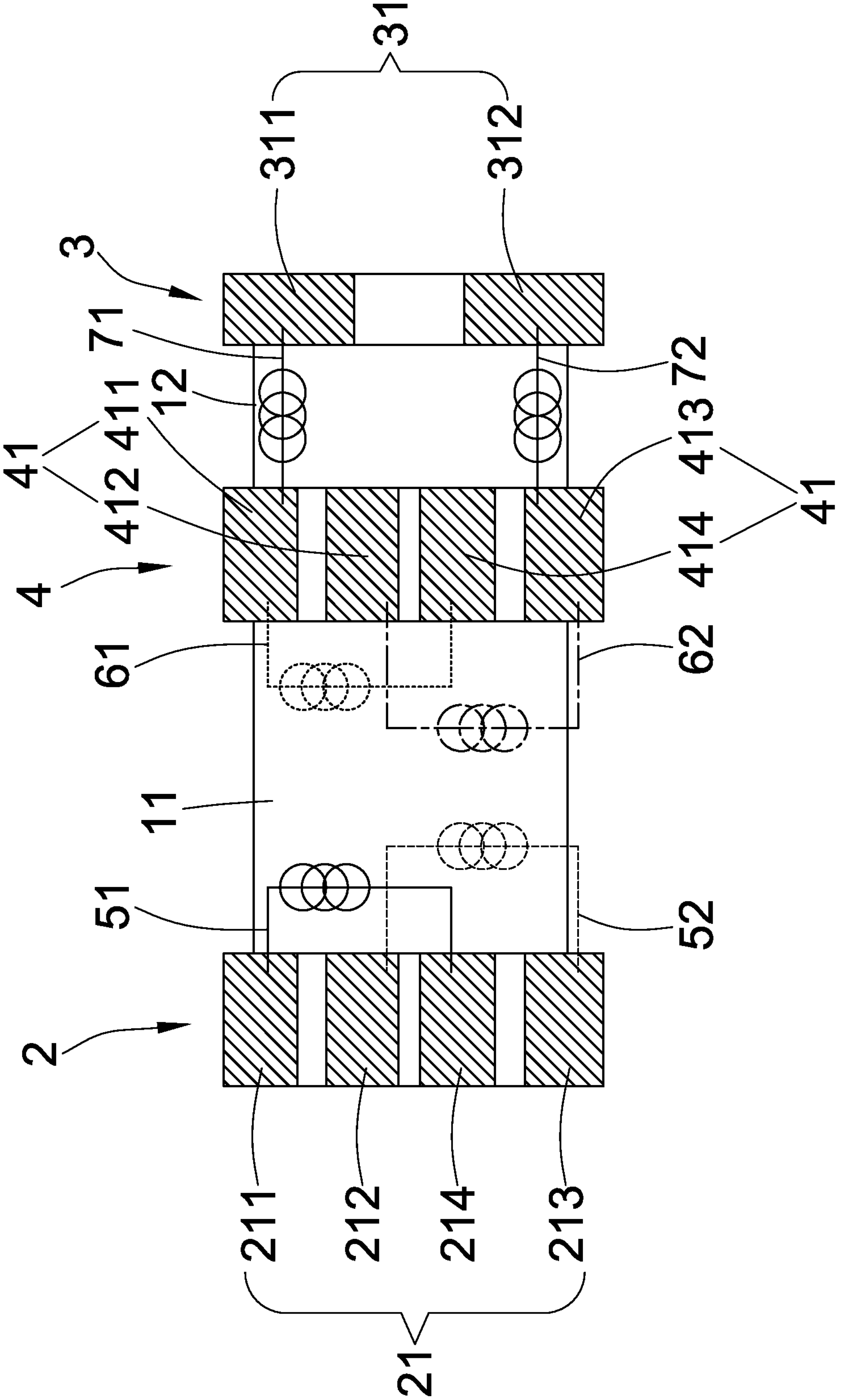
FIG. 4 is another schematic diagram showing the network transformer of FIG. 3.

As shown in FIGS. 3 and 4, a network transformer according to an embodiment of the present invention includes an iron core body 1, a first winding assembly 5, a second winding assembly 6, and a third winding assembly 7. The iron core body 1 includes a first winding section 11, a second winding section 12, a first flange 2 and a second flange 3 on both ends of the iron core body 1, and a third flange 4 situated between the first flange 2 and the second flange 3. The first winding section 11 is positioned between the first flange 2 and the third flange 4, while the second winding section 12 is located between the second flange 3 and the third flange 4. On the first flange 2, there is a first electrode set 21 including a first electrode 211, a second electrode 212, a third electrode 213, and a fourth electrode 214. The second flange 3 is equipped with a second electrode set 31, which comprises a fifth electrode 311 and a sixth electrode 312. Additionally, the third flange 4 accommodates a third electrode set 41, including a seventh electrode 411, an eighth electrode 412, a ninth electrode 413, and a tenth electrode 414.

The first winding assembly 5 includes a first coil 51 and a second coil 52. Both ends of the first coil 51 and the second coil 52 are electrically connected (soldered) to the first electrode set 21 and are wound around the first winding section 11.

The second winding assembly 6 includes a third coil 61 and a fourth coil 62. Both ends of the third coil 61 and the fourth coil 62 are electrically connected (soldered) to the third electrode set 41 and are wound around the first winding section 11.

The third winding assembly 7 includes a fifth coil 71 and a sixth coil 72. Both ends of the fifth coil 71 and the sixth coil 72 are electrically connected (soldered) to the second electrode set 31 and the third electrode set 41, and are wound around the second winding section.

Within the first electrode set 21, two of the electrodes can function as center taps, while the other two electrodes serve as signal ends. For instance, if the second electrode 212 and the fourth electrode 214 are used as center taps, then the first electrode 211 and the third electrode 213 serve as signal ends. Alternatively, if the first electrode 211 and the third electrode 213 are designated as center taps, then the second electrode 212 and the fourth electrode 214 act as signal ends. Consequently, the two ends of the first coil 51 of the first winding assembly 5 are respectively electrically connected to a signal end and a center tap, while the two ends of the second coil 52 are electrically connected to a signal end and a center tap that are different from those used by the first coil 51.

Similarly, within the third electrode set 41, two of the electrodes can function as center taps, while the other two electrodes serve as signal ends. For instance, if the eighth electrode 412 and the tenth electrode 414 are used as center taps, then the seventh electrode 411 and the ninth electrode 413 serve as signal ends. Alternatively, if the seventh electrode 411 and the ninth electrode 413 are designated as center taps, then the eighth electrode 412 and the tenth electrode 414 act as signal ends. Consequently, the two ends of the third coil 61 of the second winding assembly 6 are respectively electrically connected to a signal end and a center tap, while the two ends of the fourth coil 62 are electrically connected to a signal end and a center tap compared that are different from those use by the third coil 61.

One end of the fifth coil 71 and one end of the sixth coil 72 of the third winding assembly 7 are electrically connected to the signal ends of the third electrode set 41.

Figure 5:
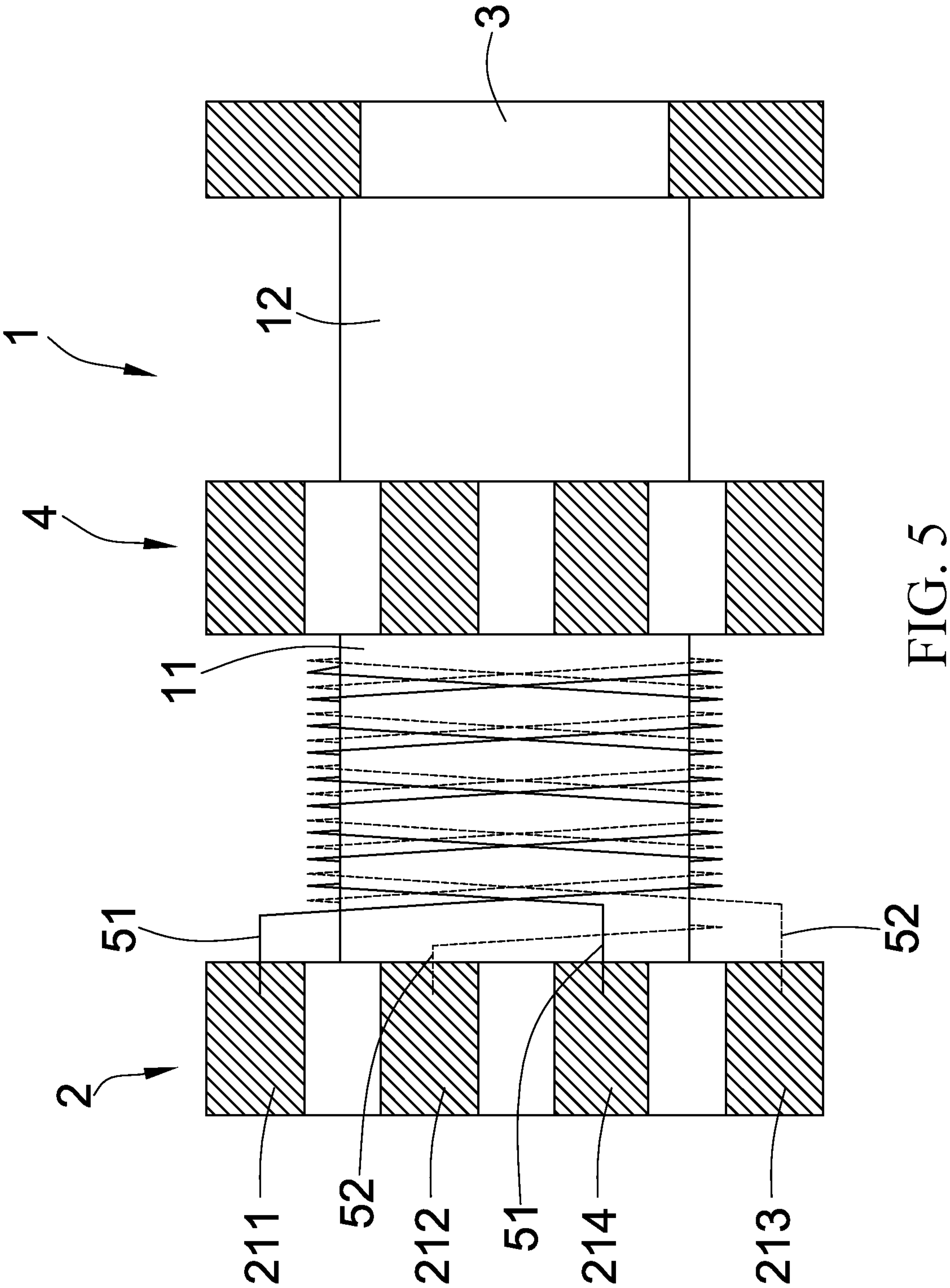
FIG. 5 is a schematic diagram showing a first winding assembly of the network transformer of FIG. 3.
Figure 6:
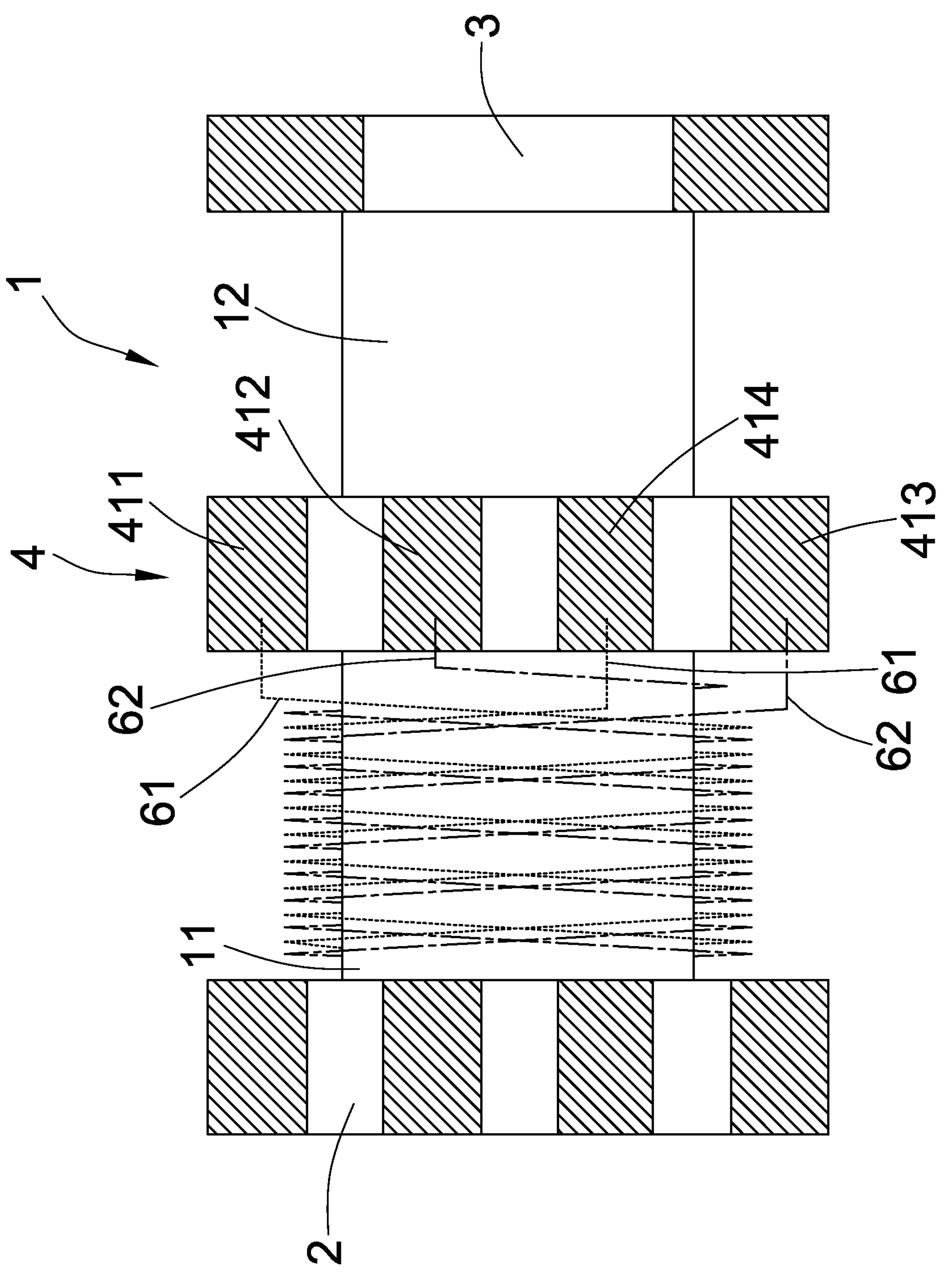
FIG. 6 is a schematic diagram showing a second winding assembly of the network transformer of FIG. 3.

As shown in FIGS. 5 and 6, the winding for each coil of the first winding section 11 is as follows (taking the second electrode 212, fourth electrode 214, eighth electrode 412, and tenth electrode 414 as center taps, for example). For the first coil 51 and the second coil 52, they are respectively electrically connected to the first electrode 211 and the second electrode 212. Both the first coil 51 and the second coil 52 are wound towards the direction of the third flange 4 on the first winding section 11. Upon encountering the third flange 4, they turn back and wind towards the direction of the first flange 2 on the first winding section 11. Finally, the first coil 51 and the second coil 52 are electrically connected (soldered) to the fourth electrode 214 and the third electrode 213, respectively. For the third coil 61 and the fourth coil 62, they are respectively electrically connected to the seventh electrode 411 and the eighth electrode 412. Both the third coil 61 and the fourth coil 62 are wound towards the direction of the first flange 2 on the first winding section 11. Upon encountering the first flange 2, they turn back and wind towards the direction of the third flange 4 on the first winding section 11. Finally, the third coil 61 and the fourth coil 62 are electrically connected (soldered) to the tenth electrode 414 and the ninth electrode 413, respectively.

As shown in FIGS. 3 and 4, the winding for each coil of the second winding section 12 is as follows (taking the second electrode 212, fourth electrode 214, eighth electrode 412, and tenth electrode 414 as center taps, for example). The fifth coil 71 starts from the seventh electrode 411 and is wound towards the direction of the second flange 3 on the second winding section 12. Finally, it is electrically connected (soldered) to the fifth electrode 311. The sixth coil 72 starts from the ninth electrode 413 and is wound towards the direction of the second flange 3 on the second winding section 12. Finally, it is electrically connected (soldered) to the sixth electrode 312. If the seventh electrode 411 and the ninth electrode 413 are used as center taps for the third electrode set 41, then the fifth coil 71 starts from the eighth electrode 412 and is wound towards the direction of the second flange 3 on the second winding section 12. Finally, it is electrically connected (soldered) to the fifth electrode 311. The sixth coil 72 starts from the tenth electrode 414 and is wound towards the direction of the second flange 3 on the second winding section 12. Finally, it is electrically connected (soldered) to the sixth electrode 312.

The second winding section 12 is equipped with the fifth coil 71, and the fifth coil 71 has the sixth coil 72 placed on it. Alternatively, the second winding section 12 is equipped with both the fifth coil 71 and the sixth coil 72, with the fifth coil 71 and the sixth coil 72 positioned parallel to each other on the second winding section 12.

By electrically connecting (soldering) both ends of the first coil 51 and the second coil 52 in the first winding assembly 5 to the first electrode set 21, and by electrically connecting (soldering) both ends of the third coil 61 and the fourth coil 62 in the second winding assembly 6 to the third electrode set 41, a transformer is achieved. Then, by further electrically connecting (soldering) the two ends of the fifth coil 71 and the sixth coil 72 in the third winding assembly 7 to the third electrode set 41 and the second electrode set 31 respectively, a common-mode filter is achieved. This integration of the transformer and common-mode filter into a single unit reduces the need for flanges, effectively decreases the product's size, and reduces the time and cost required for manufacturing and assembly. Additionally, this design achieves the same circuit effects as conventional network transformers.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A network transformer, comprising:

an iron core body comprising a first winding section, a second winding section, a first flange and a second flange on both ends of the iron core body, and a third flange situated between the first flange and the second flange, where the first winding section is positioned between the first flange and the third flange, while the second winding section is located between the second flange and the third flange; the first flange has a first electrode set comprising a first electrode, a second electrode, a third electrode, and a fourth electrode; the second flange has a second electrode set comprising a fifth electrode and a sixth electrode; the third flange has a third electrode set comprising a seventh electrode, an eighth electrode, a ninth electrode, and a tenth electrode;

a first winding assembly comprising a first coil and a second coil, where both ends of the first coil and the second coil are electrically connected to the first electrode set and are wound around the first winding section;

a second winding assembly comprising a third coil and a fourth coil, where both ends of the third coil and the fourth coil are electrically connected to the third electrode set and are wound around the first winding section; and a third winding assembly comprising a fifth coil and a sixth coil, where both ends of the fifth coil and the sixth coil are electrically connected to the second electrode set and the third electrode set, and are wound around the second winding section.

2. The network transformer according to claim 1, wherein two of the electrodes of the first electrode set function as center taps; and the other two electrodes serve as signal ends.

3. The network transformer according to claim 1, wherein two of the electrodes of the third electrode set function as center taps; and the other two electrodes serve as signal ends; one end of the fifth coil and one end of the sixth coil of the third winding assembly are electrically connected to the signal ends of the third electrode set.

4. The network transformer according to claim 1, wherein, on the second winding section, the sixth coil is wound around the fifth coil on the second winding section.

5. The network transformer according to claim 1, wherein, on the second winding section, the fifth coil and the sixth coil are positioned parallel to each other.

* * * * *